United States Patent
Rothman (10) Patent No.: US 8,630,923 B2
(45) Date of Patent: Jan. 14, 2014

(54) VIRTUAL SHELF WITH SINGLE-PRODUCT CHOICE AND AUTOMATIC MULTIPLE-VENDOR SELECTION

(75) Inventor: Simon Rothman, Palo Alto, CA (US)

(73) Assignee: Glyde Corporation, Palo Alto, CA (US)

( * ) Notice: Subject to any disclaimer, the term of this patent is extended or adjusted under 35 U.S.C. 154(b) by 691 days.

(21) Appl. No.: 11/963,675

(22) Filed: Dec. 21, 2007

(65) Prior Publication Data

US 2009/0164338 A1 Jun. 25, 2009

(51) Int. Cl.
*G06Q 30/00* (2012.01)
(52) U.S. Cl.
USPC ........ 705/27.2; 705/26.1; 705/26.7; 705/27.1
(58) Field of Classification Search
USPC ....................................................... 705/27.2
See application file for complete search history.

(56) References Cited

U.S. PATENT DOCUMENTS

| | | | |
|---|---|---|---|
| 5,117,364 A | 5/1992 | Barns-Slavin et al. | |
| 5,664,115 A * | 9/1997 | Fraser | 705/37 |
| 6,131,087 A * | 10/2000 | Luke et al. | 705/80 |
| 6,490,567 B1 | 12/2002 | Gregory | |
| 6,564,213 B1 | 5/2003 | Ortega et al. | |
| 6,598,027 B1 * | 7/2003 | Breen et al. | 705/26.25 |
| 6,714,922 B1 | 3/2004 | Sansone et al. | |
| 6,772,130 B1 | 8/2004 | Karbowski et al. | |
| 6,839,690 B1 | 1/2005 | Forth et al. | |
| 6,851,604 B2 | 2/2005 | Girotto et al. | |
| 7,111,252 B1 | 9/2006 | Harris | |
| 7,155,663 B2 | 12/2006 | Landsman et al. | |
| 7,197,475 B1 | 3/2007 | Lorenzen et al. | |
| 7,254,774 B2 | 8/2007 | Cucerran et al. | |
| 7,266,513 B2 | 9/2007 | Chalmers et al. | |
| 7,373,313 B1 | 5/2008 | Kahle et al. | |
| 7,418,410 B2 * | 8/2008 | Caiafa | 705/26.61 |
| 7,447,678 B2 | 11/2008 | Taylor et al. | |
| 7,497,369 B2 * | 3/2009 | Dalzell et al. | 235/375 |
| 7,577,582 B1 * | 8/2009 | Ojha et al. | 705/26.3 |
| 7,580,863 B2 | 8/2009 | Broussard et al. | |
| 7,610,233 B1 | 10/2009 | Leong et al. | |
| 7,630,919 B1 * | 12/2009 | Obrecht | 705/26.4 |
| 7,711,604 B1 * | 5/2010 | Walker et al. | 705/26 |
| 7,774,234 B1 * | 8/2010 | Kopelman et al. | 705/26.1 |
| 7,778,878 B2 * | 8/2010 | Harding et al. | 705/26.1 |

(Continued)

OTHER PUBLICATIONS

Gale, Bradley et al., Value-Based Marketing & Pricing; Nov. 2006, Customer Value Inc., pp. 1-20.*

(Continued)

*Primary Examiner* — Bradley B. Bayat
(74) *Attorney, Agent, or Firm* — Kilpatrick Townsend & Stockton LLP (57) ABSTRACT

A retail front-end experience for the user with a multi-seller back-end. A product is displayed on a webpage, and if the user views it, the software automatically selects at least one best supplier for each item and condition (new, used, etc.) for that user, and then displays the one specific price from only those vendors. The price includes the shipping costs from that vendor's location to the user's location. Thus, the back end is hidden from the user—the user is not forced to choose from a list of vendors. The software selects the best vendor based on a variety of criteria, such as item selection (condition, price and version), the geographic closeness of the vendor (reduced shipping costs and/or reduced shipping speed), the reliability rating of the vendor (responsiveness, product description accuracy, etc.).

38 Claims, 5 Drawing Sheets

(56) References Cited

U.S. PATENT DOCUMENTS

| | | | |
|---|---|---|---|
| 7,792,704 B2* | 9/2010 | Harding et al. ............ 705/26.1 |
| 7,877,330 B2 | 1/2011 | Siegel et al. |
| 2001/0032116 A1 | 10/2001 | Hyatt |
| 2001/0034631 A1 | 10/2001 | Kiselik |
| 2001/0037261 A1* | 11/2001 | Ishitsuka ..................... 705/26 |
| 2001/0054008 A1 | 12/2001 | Miller et al. |
| 2002/0002527 A1 | 1/2002 | Holtzman |
| 2002/0032668 A1 | 3/2002 | Kohler et al. |
| 2002/0107820 A1 | 8/2002 | Huxter |
| 2002/0107861 A1 | 8/2002 | Clendinning et al. |
| 2002/0113815 A1 | 8/2002 | DeGross |
| 2003/0020758 A1 | 1/2003 | Hinderks |
| 2003/0023499 A1* | 1/2003 | Das et al. ..................... 705/26 |
| 2003/0023500 A1 | 1/2003 | Boies et al. |
| 2003/0061147 A1 | 3/2003 | Fluhr et al. |
| 2003/0065573 A1 | 4/2003 | Nagel et al. |
| 2003/0105682 A1 | 6/2003 | Dicker et al. |
| 2003/0182222 A1 | 9/2003 | Rotman et al. |
| 2003/0200156 A1 | 10/2003 | Roseman et al. |
| 2003/0204447 A1* | 10/2003 | Dalzell et al. ................. 705/26 |
| 2003/0229552 A1 | 12/2003 | Lebaric et al. |
| 2004/0088328 A1 | 5/2004 | Cook et al. |
| 2004/0193436 A1 | 9/2004 | Stashluk et al. |
| 2005/0004889 A1 | 1/2005 | Bailey et al. |
| 2005/0071249 A1 | 3/2005 | Nix et al. |
| 2005/0102202 A1 | 5/2005 | Linden et al. |
| 2005/0144052 A1 | 6/2005 | Harding et al. |
| 2005/0192893 A1 | 9/2005 | Keeling et al. |
| 2005/0267774 A1 | 12/2005 | Merritt et al. |
| 2006/0069616 A1 | 3/2006 | Bau |
| 2006/0085272 A1* | 4/2006 | Case et al. .................... 705/26 |
| 2006/0190379 A1 | 8/2006 | Maas et al. |
| 2006/0212355 A1 | 9/2006 | Teague et al. |
| 2006/0265259 A1* | 11/2006 | Diana et al. .................... 705/7 |
| 2007/0022020 A1* | 1/2007 | Bernstein ..................... 705/26 |
| 2007/0028185 A1 | 2/2007 | Bhogal et al. |
| 2007/0083440 A1 | 4/2007 | Wirtz et al. |
| 2007/0208635 A1 | 9/2007 | Van Luchene et al. |
| 2007/0255644 A1 | 11/2007 | Elder |
| 2008/0040323 A1 | 2/2008 | Joshi |
| 2008/0109327 A1 | 5/2008 | Mayle et al. |
| 2008/0114807 A1 | 5/2008 | Sembower |
| 2008/0235042 A1 | 9/2008 | Boyd et al. |
| 2008/0288368 A1* | 11/2008 | Marks et al. .................. 705/27 |
| 2009/0064056 A1 | 3/2009 | Anderson et al. |
| 2009/0132270 A1 | 5/2009 | Baptiste |
| 2009/0164315 A1 | 6/2009 | Rothman |
| 2009/0248494 A1 | 10/2009 | Hueter et al. |
| 2009/0276522 A1 | 11/2009 | Seidel |
| 2010/0023311 A1 | 1/2010 | Subrahmanian et al. |
| 2010/0293070 A1* | 11/2010 | Kopelman et al. ............ 705/26 |
| 2011/0078232 A1 | 3/2011 | Van Den Driessche |
| 2011/0184834 A1 | 7/2011 | Perrochon et al. |

OTHER PUBLICATIONS

Amazon.com Modern Times: Music: Bob Dylan (Nov. 7, 2007). Retrieved on Mar. 25, 2011 from http://web.archive.org/web/200711_075225_rn1/www.amazon.com.

Final Office Action for U.S. Appl. No. 11/963,711, mailed on Oct. 27, 2011, 14 pages.
Final Office Action for U.S. Appl. No. 11/963,718, mailed on Oct. 9, 2011, 15 pages.
Final Office Action for U.S. Appl. No. 11/963,382, mailed on Jan. 3, 2011, 13 pages.
Final Office Action for U.S. Appl. No. 11/963,382, mailed on Nov. 27, 2009, 13 pages.
"GoShip.com Launches Service That Empowers Online Buyers to Choose Parcel Shipping Method and Allows Merchants to Cut Losses"; PR Newswire; (Apr. 3, 2000).
International Search Report and Written Opinion of PCT Application No. PCT/US/08/86960, mailed on Apr. 7, 2009, 14 pages total.
Non-Final Office Action for U.S. Appl. No. 11/963,470, mailed on May 12, 2011, 25 pages.
Non-Final Office Action for U.S. Appl. No. 11/963,718, mailed on Apr. 6, 2011, 20 pages.
Non-Final Office Action for U.S. Appl. No. 11/963,711, mailed on Jan. 25, 2011, 13 pages.
Non-Final Office Action for U.S. Appl. No. 11/963,601, mailed on Sep. 14, 2010, 13 pages.
Non-Final Office Action for U.S. Appl. No. 11/963,470, mailed on Aug. 18, 2010, 21 pages.
Non-Final Office Action for U.S. Appl. No. 11/963,382, mailed on Jun. 25, 2010, 18 pages.
Non-Final Office Action for U.S. Appl. No. 11/963,831, mailed on Feb. 2, 2010, 10 pages.
Non-Final Office Action for U.S. Appl. No. 11/963,382, mailed on Jun. 25, 2009, 13 pages.
Notice of Allowance for U.S. Appl. No. 11/963,601, mailed on Dec. 17, 2010, 8 pages.
Notice of Allowance for U.S. Appl. No. 11/963,831, mailed on Sep. 6, 2010, 8 pages.
Requirement for Restriction/Election for U.S. Appl. No. 11/963,711, mailed on Nov. 9, 2010, 10 pages.
Requirement for Restriction/Election for U.S. Appl. No. 11/963,601, mailed on Jul. 21, 2010, 8 pages.
Requirement for Restriction/Election for U.S. Appl. No. 11/963,601, mailed on Mar. 30, 2010, 14 pages.
Requirement for Restriction/Election for U.S. Appl. No. 11/963,382, mailed on Feb. 23, 2009, 6 pages.
Extended European Search Report for European Patent Application No. 08868775.1, mailed Jan. 18, 2012, 6 pages.
Office Action for U.S. Appl. No. 11/963,382, mailed on Mar. 28, 2012.
Notice of Allowance for U.S. Appl. No. 11/963,382, mailed on Oct. 29, 2012.
Office Action for U.S. Appl. No. 13/555,294, mailed on Nov. 9, 2012.
Office Action for U.S. Appl. No. 11/963,470, mailed on Aug. 1, 2012.
Office Action for U.S. Appl. No. 12/906,013, mailed on Jul. 12, 2012.
Smith, Michael D., t"The Impact of Shopbots on Electronic Markets", Journal of the Academy of Marketing Science, vol. 30, No. 4, Fall 2002, pp. 446-454.
Office Action for U.S. Appl. No. 13/164,385, mailed on Nov. 29, 2012, 18 pages.
Notice of Allowance for U.S. Appl. No. 11/963,382, mailed on Jan. 24, 2013, 17 pages.

* cited by examiner

VIRTUAL SHELF WITH SINGLE-PRODUCT CHOICE AND AUTOMATIC MULTIPLE-VENDOR SELECTION

CROSS-REFERENCES TO RELATED APPLICATIONS

Related applications are Ser. No. 11/963,382, entitled "System and Method for Dynamic Product Pricing"; Ser. No. 11/963,711, "Software System for Decentralizing eCommerce with Single Page Buy,"; Ser. No. 11/963,718, "3D Product Display on Internet with Content or Transaction Data on Back of Image"; Ser. No. 11/963,470, "Product Distribution System and Method Thereof"; Ser. No. 11/963,592, now U.S. Pat. No. 7,831,584, "System and Method for Providing Real-Time Search Results on Merchandise,"; and Ser. No. 11/963,601, now U.S. Pat. No. 7,899,716, "System and Method for Integrated Payment and Shipping Information,"; all filed even date herewith.

BACKGROUND OF THE INVENTION

The present invention relates to a graphical user interface (GUI) for a website selling products or services over the Internet, and in particular to websites offering products or services from multiple vendors.

Many websites, such as Shopping.com, provide products which are displayed on a single page, with the user being able to click to get to different suppliers for that product (such as new and used 3rd party book suppliers). eBay or Amazon Marketplace, in contrast, list the same item many times, with each supplier having a posting on a separate page.

Amazon Technologies Inc. US Patent Application Publication No. 2005/0144052 shows the Amazon display of multiple sellers of an item. The system described identifies those sellers (1) that are offering the item for sale, (2) whose availability level for the selected item exceeds a predetermined availability threshold, and (3) that have a seller score relating to a number of different items offered for sale by the seller that exceeds a predetermined score threshold.

Catalog City U.S. Pat. No. 7,197,475 is an example of a multi-vendor Internet site. It describes sharing certain facilities among multiple vendors (consumer database, shopping cart facility, checkout facility, etc.). IBM US Patent Application Publication No. 20030023499 describes an automated purchasing system over the Internet which compares products from multiple vendors and automatically selects one. The criteria for selecting can include price, vendor reputation (such as fulfillment history) and shipping times and costs. Deja.com US Patent Application Publication No. 20020107861 is another example of a website that displays a product and includes a list of multiple vendors offering that product using scraper technology. Neomedia Technologies US Patent Application Publication No. 20010054008 describes a system where a user inputs a list of products by entering their bar codes, and a vendor is selected based on criteria such as the number of products on the list available from the vendor, price, proximity to the vendor, availability of delivery, whether the products are in stock, wrapping availability, shipping availability, tracking availability, and a loyalty program.

BRIEF SUMMARY OF THE INVENTION

The present invention provides a retail front-end experience for the user with a multi-seller back-end. A product is displayed on a webpage, and if the user views it, the software automatically selects at least one best supplier for each item and condition (new, used, etc.) for that user, and then displays the one specific price from only those vendors. The price includes the shipping costs from that vendor's location to the user's location. Thus, the back end is hidden from the user—the user is not forced to choose from a list of vendors. The software selects the best vendor based on a variety of criteria, such as item selection (condition, price and version), the geographic closeness of the vendor (reduced shipping costs and/or improved shipping speed), the reliability rating of the vendor (responsiveness, product description accuracy, etc.).

Embodiments of the present invention optimize as many factors as possible for a buyer to have a simplified buying experience. The "best" vendor is selected by balancing the lowest item price, the lowest cost and fastest shipping (seller) location and highest seller reliability rating. These are calculated without visibility to the user. Thus, a multi-seller site appears to be a normal retail site to the user. The user is simply buying a certain product from that site, without having to select or worry about which seller is providing it.

The present invention provides the advantage of simplifying the selection among multiple vendors. At the same time, it preserves the user's ability to decide between specific items and specific item conditions, and in one embodiment makes that decision easy to execute with a one page buy window.

DETAILED DESCRIPTION OF THE INVENTION

User Interface

Figure 1:
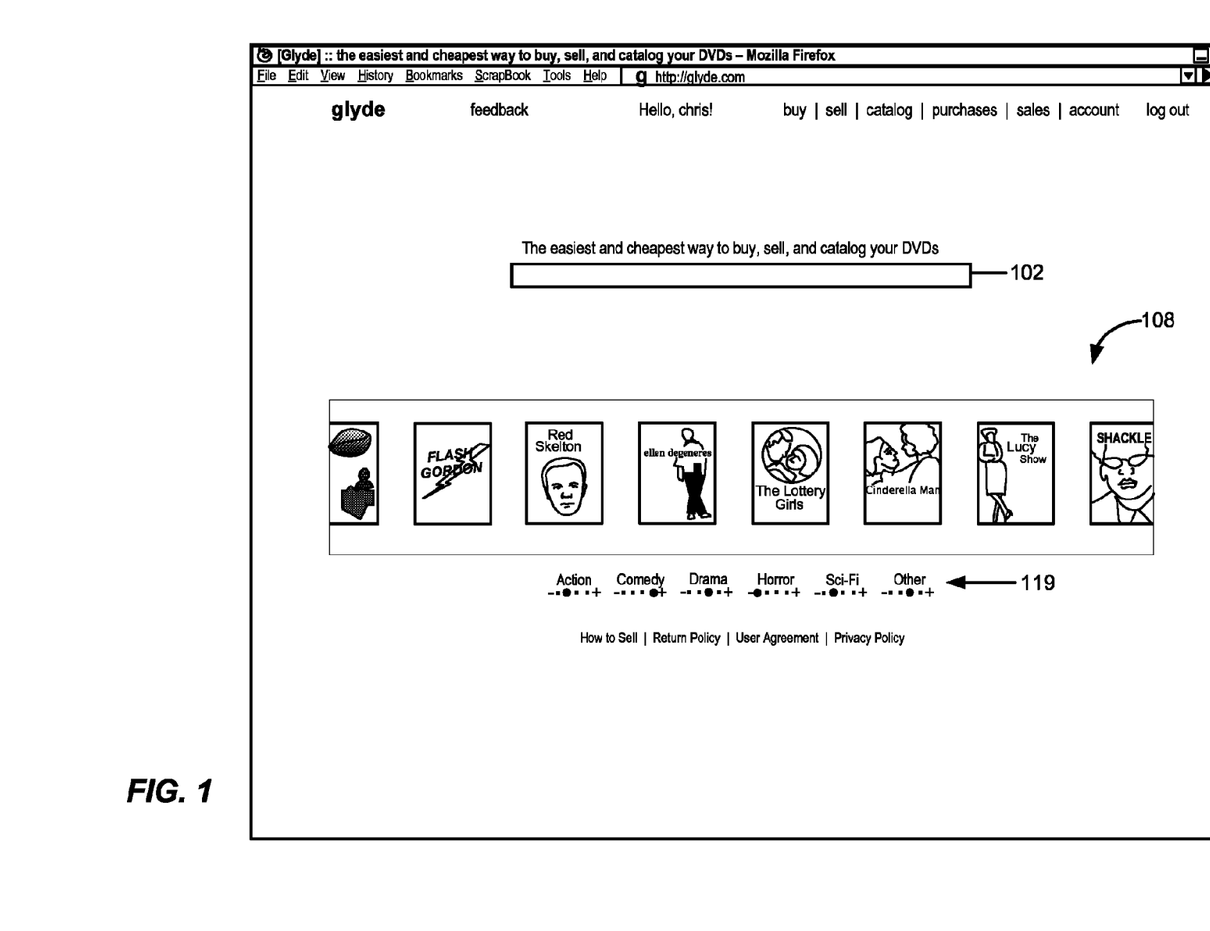
FIG. 1 is a diagram illustrating a user interface according to an embodiment of the invention.

FIG. 1 is a diagram of a user interface for search query results according to one embodiment of the invention. The interface, prior to any user input, includes a text input box 102 (note there is no search click button as in prior art systems). A window 108 shows artwork for multiple products which glide across in a stream. Buttons 119 allows user selection of what genre or category of products is shown in window 108.

Figure 2:
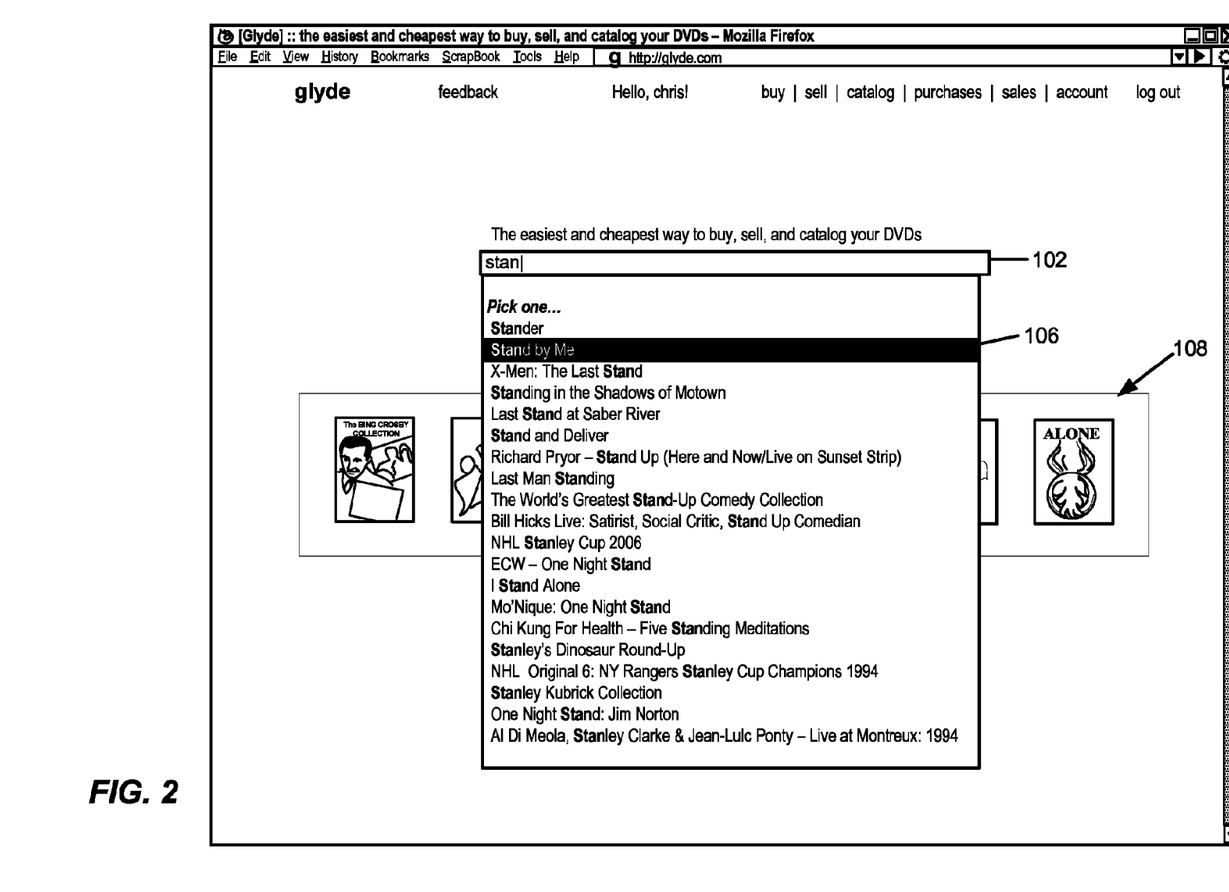
FIG. 2 shows the diagram of FIG. 1 modified with a drop-down list according to an embodiment of the invention.

As an end user enters a search query, a dropdown list 106 appears as shown in FIG. 2 (alternately, other methods of displaying results could be used). The dropdown list includes search results. The letters or words typed by the user are highlighted.

Figure 3:
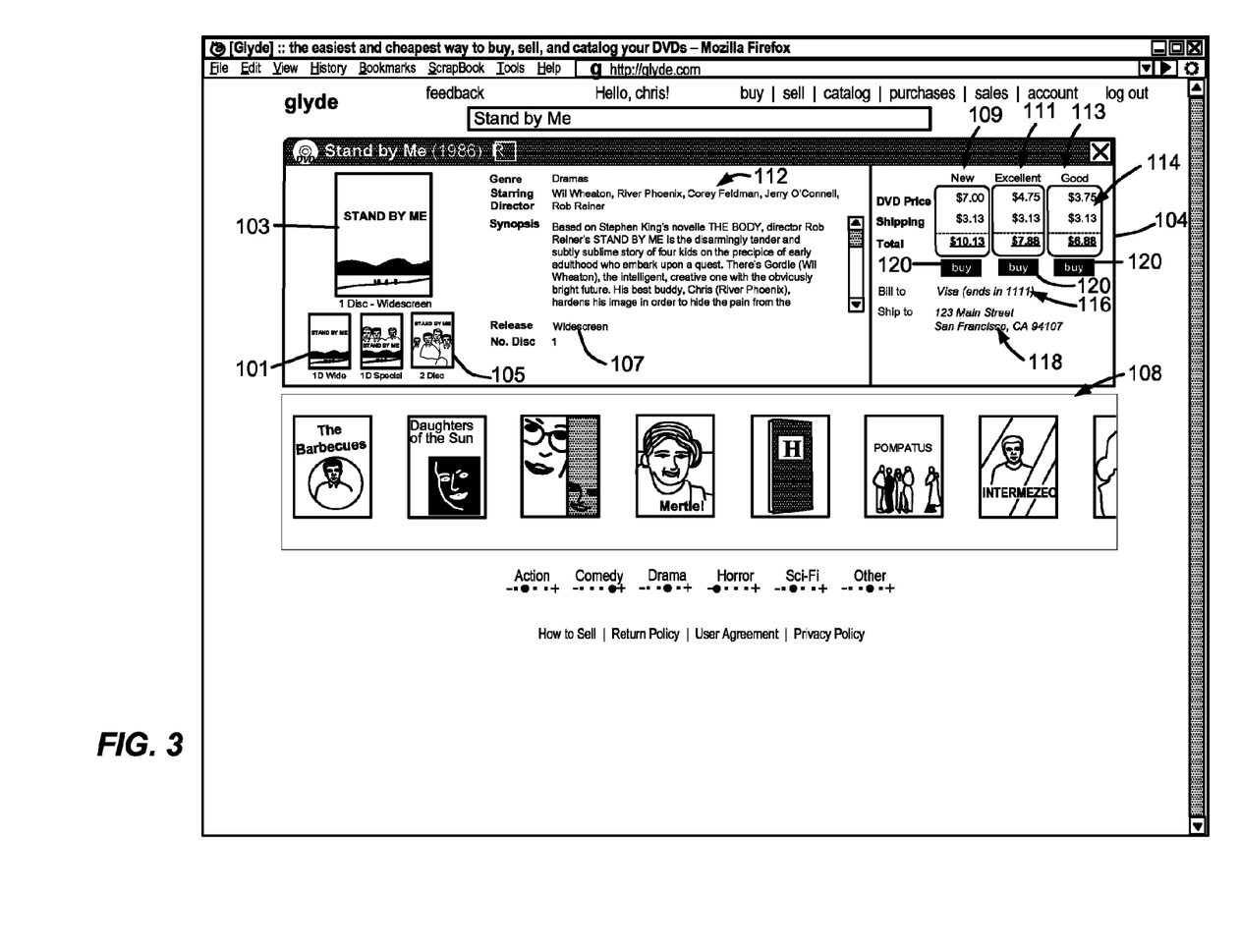
FIG. 3 is a diagram illustrating the selection and presentation of a single product offered by multiple vendors upon the selection of a product in FIG. 1 according to an embodiment of the invention.

The user can select an item from the drop down list. Alternately, a separate click button could be provided. Once the user clicks, a window 104 is brought up, as shown in FIG. 3, displaying the product along with information allowing the user to buy. Alternately, the user can click on one of the images in scrolling window 108 to bring up window 104.

Alternately, instead of a window 108 with multiple products, a single static ad could be clicked on to bring up window 104, or even just text with the product name in an article, blog, etc. Although the selected product is offered by multiple vendors, this information is hidden from the user, with an ideal vendor for that user being automatically selected. In one embodiment, a set of suitable vendors are automatically selected, and upon purchase (buy button clicked) the final, best vendor is chosen. A single, common product presentation is provided (rather than having separate product presentations for each vendor).

FIG. 3 illustrates window 104 showing more information on a selected product which has been clicked on. Window 104 includes artwork 103 and product description 112, including a version 107. Alternate versions are represented by smaller images 101 and 105. Upon clicking on either image 101 or 105, that version will replace image 103, as well as making appropriate changes to the text 112 (such as changing the version reference 107). In addition, the pricing information is changed as discussed below. Window 104 can show one product, or a number of versions or conditions of product.

The example of FIG. 3 shows 3 versions, and 3 conditions for each version. The user thus has the option of buying a new DVD 109 (or book or other product), a used DVD in excellent condition 111, or a used DVD in good condition 113. Thus, a single seller is selected for each stock keeping unit (SKU) and each condition category for that SKU. The 3 versions and 3 conditions give 9 combinations, and there could be from one to thousands of sellers for each combination. For purposes of simplicity and quality of the user experience, poor condition products are not displayed. Alternate embodiments may provide more options for the user, such as more degrees of product condition, or different ranges of prices or different seller reliability.

Each product is listed with price information 114. The price information includes the shipping costs. The shipping cost is calculated based on the dimensions and weight of the product, the address of the seller, and the address of the buyer. Because both seller and buyer information is stored, it is available at the time the user clicks on the product, and the calculation is run before window 104 is displayed. In one embodiment, a particular seller is not selected until the user decides to buy; the software simply determines if there is at least one seller available with the right and/or lowest product price and a sufficient reliability rating and a best shipping cost/speed.

If the windows are on the system server, a local database can be used. If the windows are on a 3rd-party computer or device, the information is pushed over the Internet from the database to the window.

In one embodiment, the product is offered by multiple sellers. The price information is calculated by first determining that there is at least one appropriate seller using a number of factors, including seller reliability, item price and seller proximity to the user, to select a seller with the right item price, low shipping costs and high responsiveness and reliability. The price 114 reflects the offer price and shipping price for such appropriate sellers. In one embodiment, an actual seller is not picked until a buyer makes a buy decision. The software merely determines that there are one or more sellers who can supply the product at the price and shipping costs displayed.

If the user changes the version displayed by clicking on images 101 or 105, the determination of available sellers and shipping costs is re-done, and the pricing information 114 may change.

Additionally, since the buyer information is available, the buyer preferred payment information 116 is displayed, in this instance the last digits of a credit card. Alternately, if sufficient funds are available in the buyer's online account, that account will be used first, and the name of the account and/or the available balance may be displayed instead of, or in addition to, the credit card information. For example, both the online account and credit card may be used if there are insufficient funds in the online account. For a further description of how the online account works, reference is made to co-pending, co-owned application Ser. No. 11/963,601, now U.S. Pat. No. 7,899,716, "System and Method for Integrated Payment and Shipping Information,"; filed even date herewith and hereby incorporated herein by reference.

Also, if the buyer has registered and is logged in, the buyer's preferred shipping address 118 is displayed for the buyer to see. Thus, no matter what site the buyer is browsing on, the buyer information is readily available. If the buyer agrees, the buyer can initiate what is truly a single click, or a single page, buy. This is done by clicking on one of buy buttons 120. If the buyer instead wants to select a different payment mechanism or shipping address, the buyer can click on payment information 116 or address 118 to bring up other options the buyer has previously entered, and a form for entering new data. If the buyer enters a different shipping address, the shipping costs and/or seller selection may be re-calculated.

Figure 4:
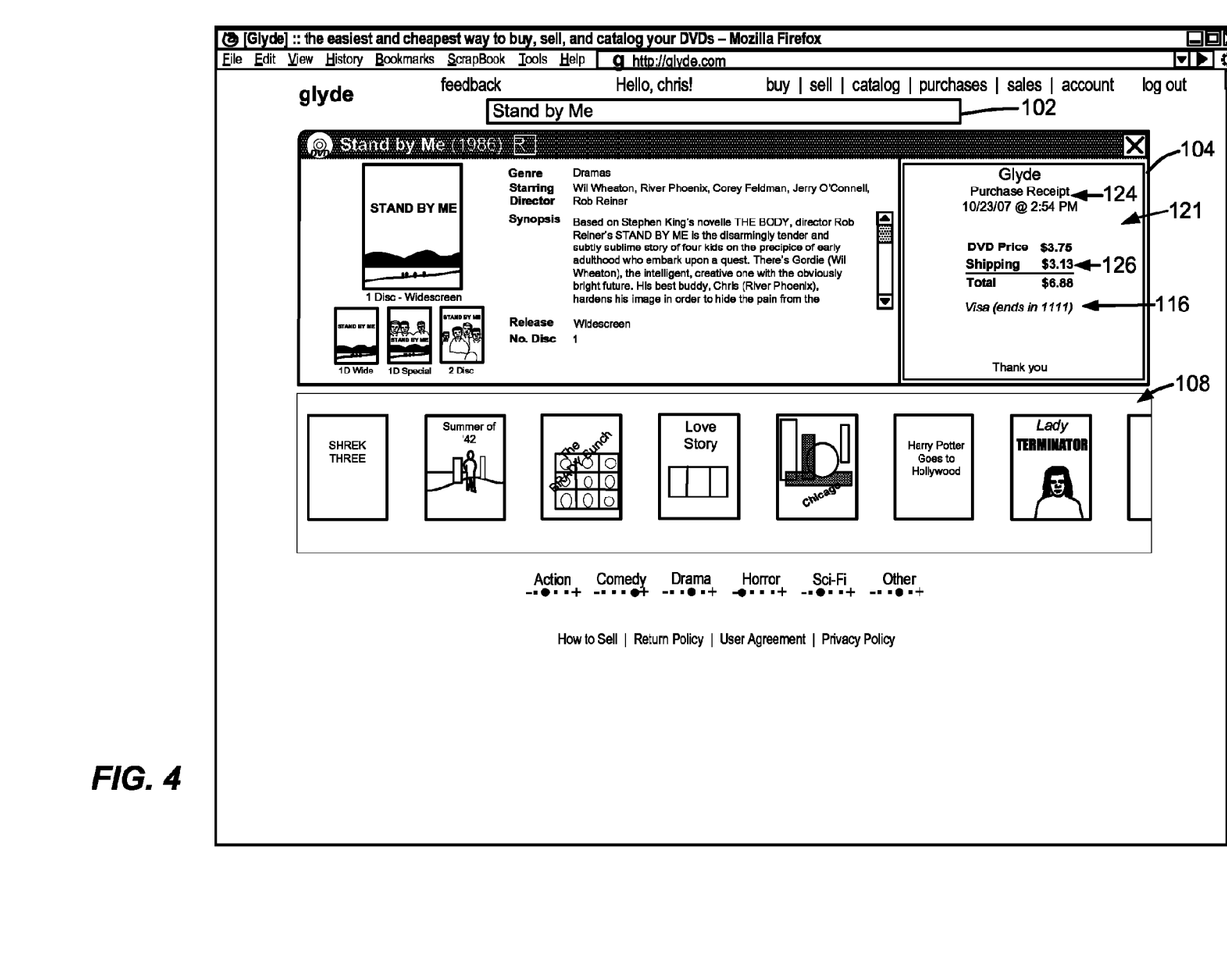
FIG. 4 shows the diagram of FIG. 3 altered to show a buyer receipt upon clicking of a buy button by a user.

Once the user clicks a buy button 120, the product pricing information is replaced by a receipt 121 as shown in FIG. 4. The receipt includes a date stamp 124, the pricing 126 for the selected option, and the payment information 116. The receipt may, in alternate embodiments, also include the version and condition selected. Alternately, instead of or in addition to date stamp 124, an estimated delivery time may be displayed. If the user doesn't like the delivery time, the user can choose a different, perhaps more expensive, delivery option, such as by clicking on the delivery date. The payment information can include an apportionment between the buyer's online account and a credit card or other external payment instrument. At the same time, an email with the same information is sent to the user's registered email address, along with an estimated delivery date. In an alternate embodiment, tracking information and an estimated shipping date could be provided to the user. However, to keep the user experience simple, only the delivery date may be shown, with tracking done without requiring user involvement.

In one embodiment, user preferences are stored, including a preferred shipping speed and cost. Some users may prefer cheaper shipping costs as a default with longer shipping time. Other users may prefer quicker, more costly shipping. This preference data can be stored explicitly, by the user entering the data. Alternately, the preference can be determined implicitly, by inferring the preference from the user behavior. If the user always selects the quicker, more expensive delivery, the preference can be changed to that.

In one embodiment, if a user hasn't logged in, the user address is not known because it is stored on the remote server's database. In such a case, a shipping speed and cost that will reach anywhere in the service area is used. Once the user selects the buy option, the user will be prompted to log in so that user address information can be obtained, and an accurate shipping speed and cost calculated and displayed.

When the user clicks the buy button, one of the available sellers is selected. That seller is sent a pre-addressed, stamped mailer with a tracking bar code or other tracking data. The seller is also sent an email at the seller's registered email address advising of the sale, and that the mailer is being sent. More details on the generation and tracking of the mailer is set forth in co-pending, co-owned patent application Ser. No. 11/963,470,"Product Distribution System and Method Thereof", filed even date herewith, and hereby incorporated herein by reference.

In one embodiment, a "no-packaging" option is displayed. This is particularly useful for DVDs, CDs and other disc products, where only the bare disc can be sent, without the packaging and its cover art. Since most damage occurs to the packaging, a seller can list a product as being in excellent condition without the packaging, whereas with the packaging it would have to be listed as merely good. The user benefits as well. Since the risk of mis-described condition lies mostly with the condition of the packaging, the no-packaging option is more likely to have a correct description. Additionally, the shipping costs may be less. If the buyer selects such an option, the sellers are recalculated along with the shipping costs. In one option, the mailer includes an insert to go with the unpackaged disk inserted by the seller. The insert can be a song list, liner notes, collateral (marking materials), etc.

System

Figure 5:
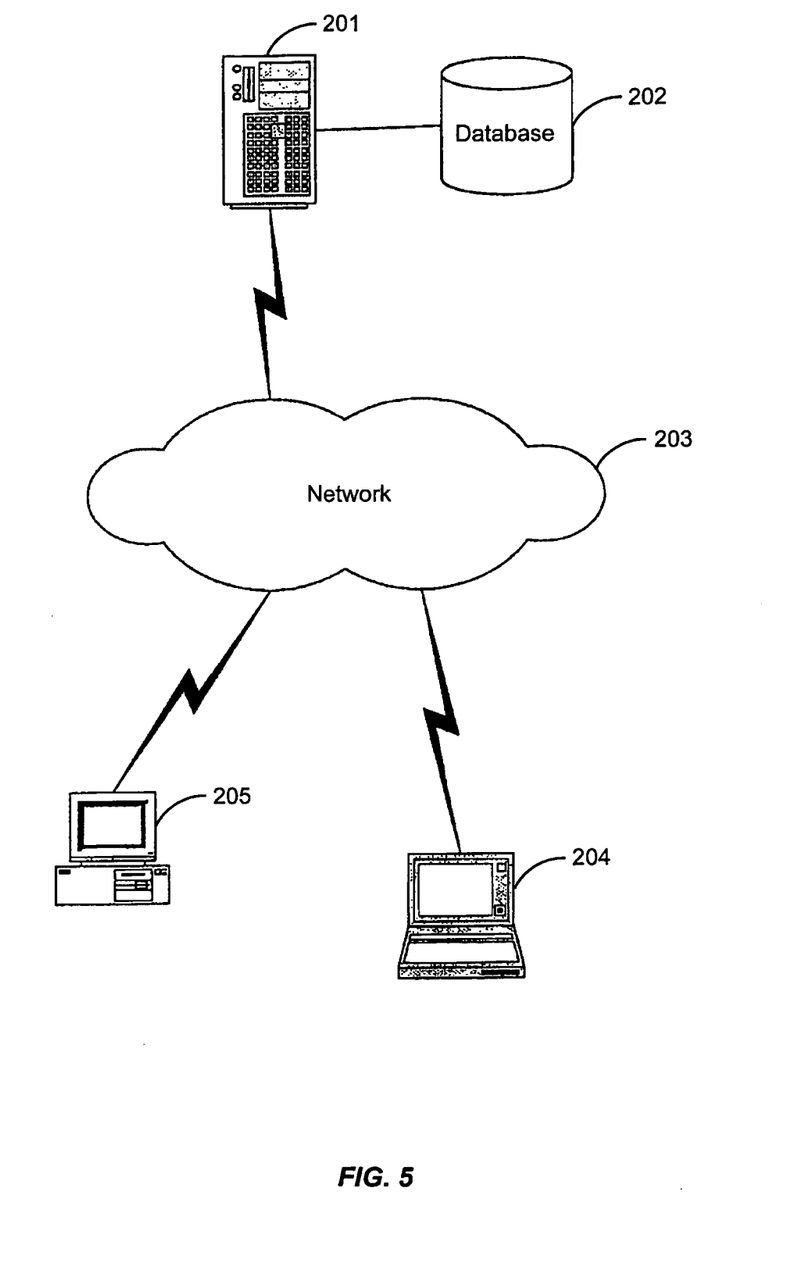
FIG. 5 is a diagram of an overall system supporting the present invention.

FIG. 5 illustrates a system supporting the present invention. A server 201 hosting the multi-vendor website is connected to a network 203 (e.g., the Internet). Also connected to the Internet is a 3rd party vendor 204 which may list products for sale, barter, rent, or for cataloging purposes, with a link to the data on the multi-vendor website. Finally, a user computer 205 is shown connected to the Internet, for browsing either the multi-vendor or 3rd party website.

The server 201 is configured to provide the interface of FIG. 1 with a display of products, and react to user actions. The server 201 may be implemented using multiple computing devices. A database 202 stores data on both vendors and users. In one embodiment, database 202 is directly connected to server 201. In another embodiment, database 202 includes multiple storage devices that are accessible over network 203 or another network.

During a search process, a partially completed search query is entered through the user interface at one of the user terminals. The search query is sent to the server 201 through the network 203. The server 201 determines what results to show based on the partially completed search query, the user profile, search pattern, search query rank, and other factors as well.

Vendor Selection Algorithm

A user (buyer or seller or both) first registers on the multi-vendor website, providing address information and billing information, such as a credit card number. Sellers also provide other information, such as a bank account to send payments to. When a user clicks on a product, the software first does a primary sort to find all vendors at the lowest price. The software then accesses the user's address information, and determines the closest vendors for the product selected at the right price with high reliability and that optimize shipping speed and cost (such as by being located nearby). Vendors are considered equally close if the shipping times and shipping costs would be the same, regardless of whether one vendor is actually geographically closer to the customer. In addition, the system tracks seller history, and may know that a seller farther away typically ships earlier than a closer seller, thus offsetting the additional shipping time.

The ratings of the closest vendors at the same item price are then compared. In particular, the vendor with the best rating for responsiveness and accuracy of product description and with the best shipping time and cost is selected. If multiple eligible vendors have the same rating, one can be selected according to a round-robin or other method. One other method of selecting vendors is based on a weighted algorithm taking into account the number of transactions that seller has handled, the tenure of the seller on the site, and other factors.

Vendor ratings include data on the vendor's record of (1) responsiveness, (2) accuracy of description of products and (3) accuracy of shipment. The responsiveness can be automatically tracked with the shipping mailers as described above. The accuracy can be assumed in the absence of buyer complaints. The buyer has the option to provide feedback on whether the product was the right model, condition, etc. The vendor rating in one embodiment is R (rating)=A*(responsiveness)+B*(accuracy of description), where A and B are weighting variables that can be constants or exponential or other variables themselves. Other factors can be added, multiplied or otherwise factored into the algorithm, including how recently the seller has had activity (time to most recent transaction), the number of transactions by that seller, site tenure, the type of transactions of that seller, and whether the seller is also a buyer.

When the list of eligible vendors is selected, the shipping cost from the known vendor location to the known customer location is calculated. The product dimensions and weight are also known, as well as the best shipping method. All these calculations are done before the product information is even displayed to the user after clicking on the product image (except that the system determines that at least one vendor is available at that shipping price, but doesn't necessarily select the exact vendor until after the user clicks the buy button). Thus, the user will see the item price and shipping costs for the selected vendor, with the vendor selection happening in the background opaque to the user, simplifying the user experience.

Speed of Data Acquisition

In one embodiment, the present invention is able to determine an appropriate vendor in time to display that vendor to the customer without a noticeable delay. This is accomplished through a number of techniques. First, as soon as the customer's browser accesses the multi-vendor website, either directly or through an ad link from a third party site, a cookie on the user's computer is read to determine the user identity. If the user is already registered, and logs in to the multi-vendor server, the payment and shipping address data is retrieved from the remote multi-vendor server. Alternately, payment and shipping data could be stored on the customer computer, with appropriate techniques used to identify the correct user for shared computers.

In one embodiment, the time-sensitive data (like market price, vendor availability, etc.) is updated using a Comet software program or similar program. Comet enables web servers to send data to the browser without the need by the browser to continually re-request it. It allows creation of event-driven web applications, enabling real-time interaction in a browser. An open connection is established by the browser with the server allowing the server to update data on the client in real time. For example, as shown in FIG. 3, the item price (DVD price) is updated in real time so the user will always get the best price. If the user decides to change the genre by selecting a genre button at the bottom of the page (action, comedy, etc.), new ads for just that genre will be provided in real time by pushing them to the browser. Other data does not change, minimizing the bandwidth requirements. For example, the cover art, description, version, buy buttons, etc. should usually be stable, almost never changing. The price is calculated for the buyer before it is displayed, so it also would usually not change, unless the buyer leaves the window open for some time and the market price changes while the window is open. For a further description of the market price, see co-owned application Ser. No. 11/963,382, filed even date herewith, entitled "System and Method for Dynamic Product Pricing", the disclosure of which is hereby incorporated herein by reference.

User Preferences

In one embodiment, the process of selection of the best vendor can employ user preference data. For example, when the user registers, the user can express a preference for new vs. used books, or hardcover vs. paperback. That information can be used not only to determine what vendor to select, but what product to display in scroll windows for the user. A user can also express a default preference for quicker shipping time over low shipping costs and/or seller reliability (which can be overridden at purchase time). This user preference can be explicitly stated or implicitly inferred from user actions. As noted above with respect to FIG. 1, genre selection buttons 119 allow a user to express a preference. For example, with respect to DVDs, the user can express a preference for comedies instead of horror movies. Multiple genres or categories can be selected at the same time. The display can also be tailored to a user with the use of collaborative filtering. The user history of what the user has sold, bought, searched, etc. can be used to select products likely to be of interest to the user to display.

It is to be understood that the examples and embodiments described above are for illustrative purposes only and that various modifications or changes in light thereof will be suggested to persons skilled in the art and are to be included within the spirit and purview of this application and scope of the appended claims. For example, while one described embodiment includes tracking of vendor responsiveness by the multi-vendor server, the responsiveness could alternately be obtained from customer feedback. For another example, the products can be DVDs, CDs, video games, books, consumer electronics (i.e., PDAs, cell phones, etc.), jewelry, toys, software or any other product or service. The product or service can be bought, bartered for or rented. The embodiments can be applied to single or multi-vendor websites, and the vendors can be individuals, large corporations, small businesses, charities or any other organization. As used in the claims, the term "products" includes services. Therefore, the above description should not be understood as limiting the scope of the invention as defined by the claims.

What is claimed is:

1. A method for selling products over a network, comprising:
   storing vendor information for a plurality of vendors in a database, said database comprising at least one storage device that is accessible over the network, and said vendor information including a vendor address;
   storing product information for a plurality of products, each product being associated with one or more of the plurality of vendors, each vendor assigning a product price to each product associated with the vendor;
   storing information indicative of a condition of one or more of the plurality of products;
   storing consumer registration information for a plurality of consumers, said consumer information including, for each consumer, a payment mechanism and a consumer shipping address;
   causing a user interface for searching the product information to be displayed to a consumer;
   receiving a user input via the user interface; after receiving the user input, performing a plurality of operations including:
      identifying the consumer from the plurality of consumers based on the consumer registration information;
      determining the consumer shipping address corresponding to the identified consumer;
      identifying one of the plurality of products based on the received user input;
      determining that there is at least a subset of said vendors offering said identified product for sale;
      selecting, without user input and on behalf of the identified consumer, from the subset of vendors an ideal vendor that is ideal to the identified consumer, the ideal vendor being selected based on one or more of a lowest product price, a lowest shipping cost, a shortest shipping time, or a best vendor rating compared to other vendors in the subset;
      determining a shipping cost for shipping the identified product to the identified consumer, the shipping cost being determined based on the consumer shipping address corresponding to the identified consumer; and
      determining a total price for the identified product, the total price being a combination of (a) the product price of the identified product assigned by the ideal vendor and (b) the shipping cost;
   after performing the plurality of operations and in response to receiving the user input, causing (a) a product representation corresponding to the identified product, (b) the total price for the identified product, (c) an option to purchase said identified product, and (d) information indicative of a condition of the identified product to be simultaneously displayed to the identified consumer; and
   in response to receiving a selection of the option to purchase said identified product by said identified consumer, causing a transaction to be performed between said identified consumer and said ideal vendor for said identified product.

2. The method of claim 1 further comprising:
   offering said identified product in different conditions;
   identifying an ideal vendor for each of the different conditions of the identified product;
   determining the price data for each of the different conditions of the identified product, the price data reflecting, for each of the different conditions, a combined price including said product price of the identified product in its particular condition and a shipping cost for shipping said identified product in its particular condition from the address of the ideal vendor offering the identified product in its particular condition to said shipping address of said identified consumer; and
   receiving, from said identified consumer, a selection indicating a desired condition selected from the offered different conditions of the identified product.

3. The method of claim 1 wherein said identified product is a specific stock keeping unit (SKU).

4. The method of claim 1 further comprising, in response to receiving a selection of the option to purchase said identified product, selecting a vendor to provide said identified product to said identified consumer.

5. The method of claim 1 further comprising:
   displaying a shipping speed for said identified product prior to receiving said selection of the option to purchase said identified product.

6. The method of claim 1 further comprising:
   displaying a general shipping speed for any consumer in a region serviced by a server associated with said database when a consumer is not logged in to permit locating a consumer address.

7. The method of claim 1 further comprising:
   displaying a specific shipping speed for said identified consumer when said identified consumer is logged in, by retrieving the consumer address corresponding to said identified consumer.

8. The method of claim 1 wherein said ideal vendor is selected to provide said identified product to said identified consumer based at least in part on said vendor rating, said vendor rating including a rating of the past responsiveness of said vendor and the accuracy of product description by said vendor.

9. The method of claim 1 wherein said ideal vendor is selected to provide said product to said identified consumer based at least in part on said lowest product price.

10. The method of claim 9 wherein said ideal vendor is further selected based on one of said lowest shipping cost and said shortest shipping time from an address of said vendor.

11. The method of claim 1 further comprising providing a single-page buy display window to said identified consumer, said single-page buy display window including (a) an image of said identified product, (b) a description of said identified product, (c) a cost of said identified product, said cost including said product price assigned to the identified product and said shipping cost, and (d) a buy button.

12. The method of claim 1 further comprising providing a product option without packaging.

13. The method of claim 1 further comprising storing consumer preferences relating to delivery speed and delivery cost.

14. The method of claim 13 further comprising implicitly determining said consumer preferences by observing consumer behavior.

15. The method of claim 2 wherein causing (a) a product representation corresponding to the identified product, (b) the total price for the identified product, (c) an option to purchase said identified product, and (d) information indicative of a condition of the identified product to be simultaneously displayed to the identified consumer, includes causing information indicative of each of the different conditions of the identified product, the total price for each of the different conditions of the identified product, and an option to purchase for each of said different conditions of the identified product to be simultaneously displayed to the identified consumer.

16. The method of claim 15 further comprising:
receiving a selection of the option to purchase the identified product having one of said different conditions; and
in response to receiving the selection of the option to purchase the identified product having one of said different conditions, causing a transaction to be performed between said identified consumer and said ideal vendor for said identified product having one of said different conditions.

17. The method of claim 15 further comprising preventing the display of information identifying the ideal vendor for each of the different conditions of the identified product.

18. The method of claim 1 further comprising:
after causing the transaction to be performed between said identified consumer and said ideal vendor for said identified product, causing a purchase receipt to be displayed while maintaining the simultaneous display of said product representation.

19. The method of claim 1 wherein selecting the ideal vendor includes:
identifying a plurality of vendors offering said identified product at a lowest product price;
determining, from the plurality of vendors offering said identified product at the lowest product price, a number of vendors that are closest to the identified consumer;
comparing the ratings of the number of vendors that are closest to the identified consumer with one another; and
selecting, based on the comparison, the ideal vendor as the vendor having the best vendor rating that is closest to the identified consumer and offering the identified product at the lowest product price.

20. A non-transitory computer-readable storage medium having instructions stored thereon that, when executed by one or more computer processors, cause the one or more computer processors to perform operations comprising:
storing vendor information for a plurality of vendors in a database, said database comprising at least one storage device that is accessible over the network, and said vendor information including a vendor address;
storing product information for a plurality of products, each product being associated with one or more of the plurality of vendors, each vendor assigning a product price to each product associated with the vendor;
storing information indicative of a condition of one or more of the plurality of products;
storing consumer registration information for a plurality of consumers, said consumer information including, for each consumer, a payment mechanism and a consumer shipping address;
causing a user interface for searching the product information to be displayed to a consumer;
receiving a user input via the user interface;
after receiving the user input, performing a plurality of operations including:
identifying the consumer from the plurality of consumers based on the consumer registration information;
determining the consumer shipping address corresponding to the identified consumer;
identifying one of the plurality of products based on the received user input;
determining that there is at least a subset of said vendors offering said identified product for sale;
selecting, without user input and on behalf of the identified consumer, from the subset of vendors an ideal vendor that is ideal to the identified consumer, the ideal vendor being selected based on one or more of a lowest product price, a lowest shipping cost, a shortest shipping time, or a best vendor rating compared to other vendors in the subset;
determining a shipping cost for shipping the identified product to the identified consumer, the shipping cost being determined based on the consumer shipping address corresponding to the identified consumer; and
determining a total price for the identified product, the total price being a combination of (a) the product price of the identified product assigned by the ideal vendor and (b) the shipping cost;
after performing the plurality of operations and in response to receiving the user input, causing (a) a product representation corresponding to the identified product, (b) the total price for the identified product, (c) an option to purchase said identified product, and (d) information indicative of a condition of the identified product to be simultaneously displayed to the identified consumer; and
in response to receiving a selection of the option to purchase said identified product by said identified consumer, causing a transaction to be performed between said identified consumer and said ideal vendor for said identified product.

21. The computer-readable storage medium of claim 20, wherein the operations further comprise:
   offering said identified product in different conditions;
   identifying an ideal vendor for each of the different conditions of the identified product;
   determining the price data for each of the different conditions of the identified product, the price data reflecting, for each of the different conditions, a combined price including said product price of the identified product in its particular condition and a shipping cost for shipping said identified product in its particular condition from the address of the ideal vendor offering the identified product in its particular condition to said shipping address of said identified consumer; and
   receiving, from said identified consumer, a selection indicating a desired condition selected from the offered different conditions of the identified product.

22. The computer-readable storage medium of claim 20 wherein said identified product is a specific stock keeping unit (SKU).

23. The computer-readable storage medium of claim 20 wherein the operations further comprise: in response to receiving a selection of the option to purchase said identified product, selecting a vendor to provide said identified product to said identified consumer.

24. The computer-readable storage medium of claim 20 wherein the operations further comprise:
   displaying a shipping speed for said identified product prior to receiving said selection of the option to purchase said identified product.

25. The computer-readable storage medium of claim 20 wherein the operations further comprise:
   displaying a general shipping speed for any consumer in a region serviced by a server associated with said database when a consumer is not logged in to permit locating a consumer address.

26. The computer-readable storage medium of claim 20 wherein the operations further comprise:
   displaying a specific shipping speed for said identified consumer when said identified consumer is logged in, by retrieving the consumer address corresponding to said identified consumer.

27. The computer-readable storage medium of claim 20 wherein said ideal vendor is selected to provide said identified product to said identified consumer based at least in part on said vendor rating, said vendor rating including a rating of the past responsiveness of said vendor and the accuracy of product description by said vendor.

28. The computer-readable storage medium of claim 20 wherein said ideal vendor is selected to provide said product to said identified consumer based at least in part on said lowest product price.

29. The computer-readable storage medium of claim 28 wherein said ideal vendor is further selected based on one of said lowest shipping cost and said shortest shipping time from an address of said vendor.

30. The computer-readable storage medium of claim 20 wherein the operations further comprise providing a single-page buy display window to said identified consumer, said single-page buy display window including (a) an image of said identified product, (b) a description of said identified product, (c) a cost of said identified product, said cost including said product price assigned to the identified product and said shipping cost, and (d) a buy button.

31. The computer-readable storage medium of claim 20 wherein the operations further comprise providing a product option without packaging.

32. The computer-readable storage medium of claim 20 wherein the operations further comprise storing consumer preferences relating to delivery speed and delivery cost.

33. The computer-readable storage medium of claim 32 wherein the operations further comprise implicitly determining said consumer preferences by observing consumer behavior.

34. The computer-readable storage medium of claim 21 wherein causing (a) a product representation corresponding to the identified product, (b) the total price for the identified product, (c) an option to purchase said identified product, and (d) information indicative of a condition of the identified product to be simultaneously displayed to the identified consumer, includes causing each of the different conditions of the identified product, the total price for each of the different conditions of the identified product, and an option to purchase for each of said different conditions of the identified product to be simultaneously displayed to the identified consumer.

35. The computer-readable storage medium of claim 34 wherein the operations further comprise:
   receiving a selection of the option to purchase the identified product having one of said different conditions; and
   in response to receiving the selection of the option to purchase the identified product having one of said different conditions, causing a transaction to be performed between said identified consumer and said ideal vendor for said identified product having one of said different conditions.

36. The computer-readable storage medium of claim 34 wherein the operations further comprise preventing the display of information identifying the ideal vendor for each of the different conditions of the identified product.

37. The computer-readable storage medium of claim 20 wherein the operations further comprise:
   after causing the transaction to be performed between said identified consumer and said ideal vendor for said identified product, causing a purchase receipt to be displayed while maintaining the simultaneous display of said product representation.

38. The computer-readable storage medium of claim 20 wherein selecting the ideal vendor includes:
   identifying a plurality of vendors offering said identified product at a lowest product price;
   determining, from the plurality of vendors offering said identified product at the lowest product price, a number of vendors that are closest to the identified consumer;
   comparing the ratings of the number of vendors that are closest to the identified consumer with one another; and
   selecting, based on the comparison, the ideal vendor as the vendor having the best vendor rating that is closest to the identified consumer and offering the identified product at the lowest product price.

* * * * *

UNITED STATES PATENT AND TRADEMARK OFFICE
CERTIFICATE OF CORRECTION

PATENT NO.       : 8,630,923 B2
APPLICATION NO. : 11/963675
DATED            : January 14, 2014
INVENTOR(S)      : Simon Rothman

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this
Thirtieth Day of May, 2017

Michelle K. Lee
*Director of the United States Patent and Trademark Office*